May 24, 1927. 1,629,656
W. DISHONG
METHOD OF WELDING AND ARTICLE PRODUCED THEREBY
Filed Sept. 9, 1926
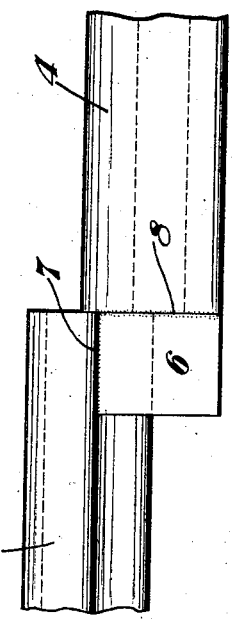
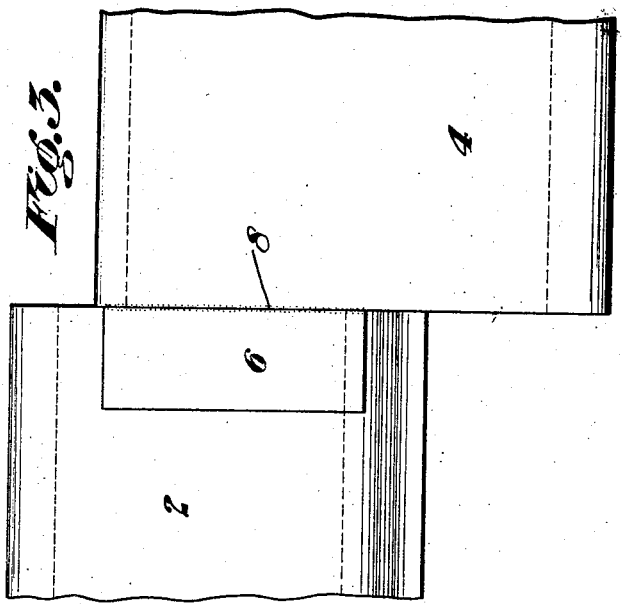
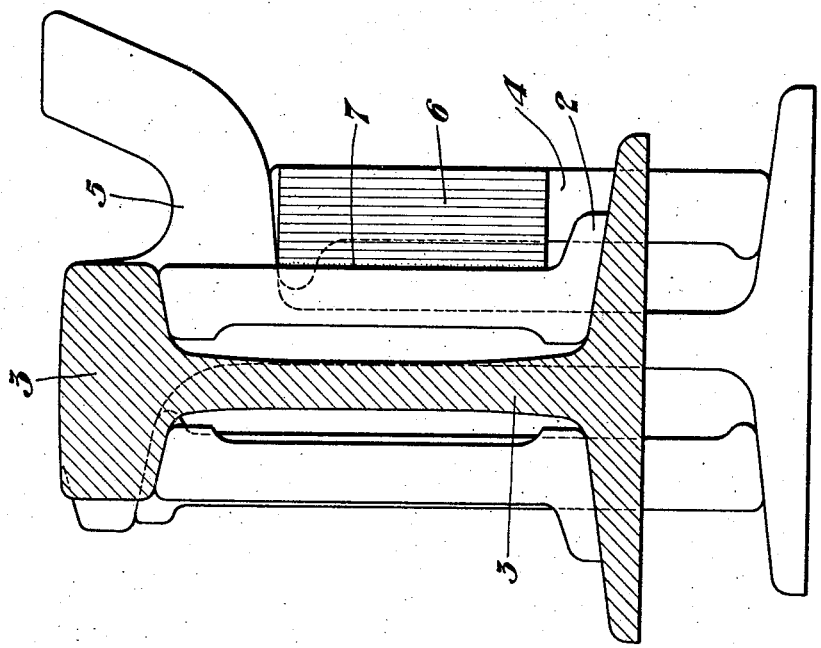
Witnesses:
Edwin Trueb
Inventor:
WILLIAM DISHONG,
by: D. Anthony Usina
his Attorney.

Patented May 24, 1927.

1,629,656

UNITED STATES PATENT OFFICE.

WILLIAM DISHONG, OF JOHNSTOWN, PENNSYLVANIA.

METHOD OF WELDING AND ARTICLE PRODUCED THEREBY.

Application filed September 9, 1926. Serial No. 134,472.

This invention relates to a method of welding and article produced thereby, and more particularly to a method of joining or welding rolled steel sections of dissimilar cross-section, such as splice bars, which are out of alinement with each other, and the compound section produced thereby, and has for its object the provision of an improved method of welding splice bars and the like of dissimilar cross-section and the provision of the novel compound section resulting therefrom.

In the drawings:

Figure 1 is a sectional view through a rail joint showing splice bars of dissimilar cross-section joined by the improved method of this application.

Figure 2 is a fragmentary top plan of the joined splice bars.

Figure 3 is a fragmentary side elevation of the joined splice bars of Figure 1.

Referring more particularly to the drawings, the numeral 2 designates a relatively small splice bar such as ordinarily used with the T-head rail 3, which is joined to the larger splice bar 4 of different cross-section such as ordinarily used with the girder rail 5.

The small splice bar 2 is necessarily out of alinement with the larger splice bar 4, and only a small portion, if any, of the end surfaces of said bars overlap. Therefore, butt-welding of said bars is impossible.

In the present invention a separate block of metal 6 is welded to the side face of the small splice bar 2 at the end to be joined to the splice bar 4, as at 7. The block 6 is of sufficient size to overlap the end of the splice bar 4, and the end of the bar 4 is butt-welded to the abutting face of the block 6, as at 8, and if any portion of the splice bar 4 overlaps the splice bar 2, such portion will be welded directly to the splice bar 2.

By forming a joint as above described, a compound splice bar section of great strength is obtained and an improved article is obtained at a minimum of cost.

While I have shown one specific embodiment of my invention, it will be understood that I do not wish to be limited thereto, since other sections than splice bars may be joined, and various modifications may be made without departing from the scope of my invention as defined in the appended claims.

I claim:

1. The method of joining metal sections, the ends of which are not in alinement, which consists in welding a separate block of metal to the side face of one of said sections adjacent the end of said section and then butt-welding the other section to said separate piece of metal.

2. The method of joining splice bars of dissimilar cross-section, not in alinement with each other and only partly overlapping, which consists in welding a block of metal to the side face of one of said sections and then butt-welding the other section to said first section and said block of metal.

3. As an article of manufacture, a compound section comprising two rolled metal sections of dissimilar cross-section and arranged out of alinement with each other, and a separate block of metal welded to the side face of one of said sections at the end thereof, and extending outwardly so as to extend to substantially the outer edge of the other section, and said other section being butt-welded to said block.

In testimony thereof, I have hereunto set my hand.

WILLIAM DISHONG.